(12) United States Patent
Tung et al.

(10) Patent No.: US 6,200,087 B1
(45) Date of Patent: Mar. 13, 2001

(54) PRESSURE COMPENSATED TURBINE NOZZLE

(75) Inventors: Stephen K. Tung, Andover; Robert B. Solda, Peabody; Robert F. Manning, Newburyport, all of MA (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/309,015

(22) Filed: May 10, 1999

(51) Int. Cl.⁷ ........................................................ F01D 5/14
(52) U.S. Cl. .......................................... 415/115; 416/97 R
(58) Field of Search .................................... 415/115, 116; 416/96 R, 96 A, 97 R, 97 A

(56) References Cited

U.S. PATENT DOCUMENTS

| 3,475,107 | | 10/1969 | Auxier . | |
|---|---|---|---|---|
| 4,257,734 | * | 3/1981 | Guy et al. ............................. | 415/115 |
| 4,616,976 | | 10/1986 | Lings et al. . | |
| 5,120,192 | * | 6/1992 | Ohtomo et al. .................... | 416/96 A |
| 5,387,086 | * | 2/1995 | Frey et al. .......................... | 416/97 R |
| 5,591,007 | * | 1/1997 | Lee et al. ............................ | 416/97 R |
| 5,741,117 | * | 4/1998 | Clevenger et al. ................ | 416/97 R |
| 5,975,850 | * | 11/1999 | Abuaf et al. ....................... | 416/97 R |
| 5,975,851 | * | 11/1999 | Liang ................................... | 416/97 R |
| 6,019,579 | * | 2/2000 | Fukuno et al. ..................... | 416/97 R |

FOREIGN PATENT DOCUMENTS

| 935763 | * | 10/1973 | (CA) | ...................................... | 416/96 |
| 0392664 | * | 10/1990 | (EP) | .................................. | 416/96 A |
| 2112467 | | 7/1983 | (GB) . | | |

* cited by examiner

*Primary Examiner*—Edward K. Look
*Assistant Examiner*—James M. McAleenan
(74) *Attorney, Agent, or Firm*—Andrew C. Hess; Rodney M. Young

(57) ABSTRACT

A turbine nozzle includes inner and outer bands having respective air inlets. A plurality of hollow vanes are integrally joined to the bands in flow communication with the inlets. Each vane includes first and second cooling channels extending between the bands which are separated by an inclined septum which converges the two channels away from the corresponding inlets for reducing pressure drop as the cooling air is discharged.

25 Claims, 4 Drawing Sheets

PRESSURE COMPENSATED TURBINE NOZZLE

BACKGROUND OF THE INVENTION

The present invention relates generally to gas turbine engines, and, more specifically, to turbine nozzle cooling therein.

In a gas turbine engine, air is pressurized in a compressor and mixed with fuel and ignited in a combustor for generating hot combustion gases which flow through turbine stages for extracting energy therefrom. In a turbofan engine, a high pressure turbine powers the compressor, and a low pressure turbine powers a fan disposed upstream from the compressor. Each turbine includes a stationary turbine nozzle having vanes mounted between inner and outer bands, followed in turn by a row of rotor blades extending outwardly from a rotor disk.

The high pressure turbine nozzle is disposed at the outlet of the combustor and receives therefrom combustion gases at the hottest temperature, with the temperature decreasing as energy is extracted from the gases in the downstream turbine stages. Both the nozzle vanes and rotor blades have hollow airfoils through which a portion of air bled from the compressor is used for providing cooling thereof. Bleeding cooling air from the compressor necessarily decreases the overall efficiency of the engine, and it is therefore desired to use as little cooling air as possible while adequately cooling the vanes and blades.

The vanes are stationary components whereas the blades are rotary components, and therefore have correspondingly different cooling arrangements in view of their different operating environment including centrifugal and thermal stress, and variations in heat transfer coefficient between the combustion gases and the respective airfoils thereof.

In one type of turbofan aircraft engine enjoying successful commercial use in this country for many years, the high pressure turbine nozzle includes three radial cooling channels between the leading and trailing edges of the vane airfoils, which are separated by corresponding radial ribs or bridges. Cooling air is provided in each vane through a common inlet in the outer band thereof, with a portion of the air splitting radially inwardly through a leading edge channel and an adjacent midchord channel. Except at the common outer inlet for the two channels, the cooling air is separately channeled therethrough.

The vanes include various film cooling holes through the pressure and suction sides thereof from which the air from the two channels is discharged for providing external film cooling of the vanes during operation.

The nozzle also includes a third, or trailing edge channel disposed aft of the midchord channel and separated therefrom by a corresponding rib or bridge. This third channel includes spaced apart pins between the pressure and suction sides of the vane for enhancing heat transfer of the cooling air channeled therebetween. Each vane includes a row of trailing edge outlet holes from which the cooling air in the third channel is discharged.

The third channel may receive its cooling air from its own inlet at the outer band, as well as an additional portion of the air from the second channel by truncating the midchord rib at its inner end. In an alternate embodiment, the midchord rib may include a row of crossover holes which provide the sole source of air into the third channel from the second channel along its span height.

To enhance the cooling effectiveness of the air channeled through the midchord channel, transversely extending turbulator ribs are typically disposed inside the pressure or concave side of the vane. Neither the first nor the third channels include turbulators to avoid the pressure drop associated therewith for maximizing engine performance while providing acceptable cooling.

The leading edges of the vanes typically have the most severe cooling requirements. They first receive the hot combustion gases which split along the pressure and suction sides of the vanes and effect significant stagnation pressure along the vane leading edges. The combustion gases have a high heat transfer coefficient along the vane leading edges and a high static pressure.

Accordingly, the air channeled through the leading edge cooling channel must have sufficient pressure greater than that of the external combustion gases to effect a backflow margin to prevent ingestion of the hot combustion gases through the film cooling holes and into the blades.

Pressure losses in the cooling air channeled through the vanes typically increase as the complexity of the cooling features increase. Although turbulators enhance cooling effectiveness they do so at the corresponding penalty and associated pressure losses therewith. This in turn requires that the provided cooling air have sufficient pressure for accommodating the expected losses therein for maintaining adequate backflow margin along the complete extent of the cooling channels to the last outlet hole.

Although the above described turbine nozzle has enjoyed many years of successful commercial use, a substantial power growth of the engine requires a corresponding increase in cooling of the nozzle which cannot be met by the present design. Engine power growth is being effected by a substantial increase in combustion gas temperature. The hotter combustion gases require a more effectively cooled turbine nozzle without excessively increasing the cooling air requirements from the compressor.

Accordingly, it is desired to provide a turbine nozzle having improved cooling features while minimizing pressure losses associated therewith.

BRIEF SUMMARY OF THE INVENTION

A turbine nozzle includes inner and outer bands having respective air inlets. A plurality of hollow vanes are integrally joined to the bands in flow communication with the inlets. Each vane includes first and second cooling channels extending between the bands which are separated by an inclined septum which converges the two channels away from the corresponding inlets for reducing pressure drop as the cooling air is discharged.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
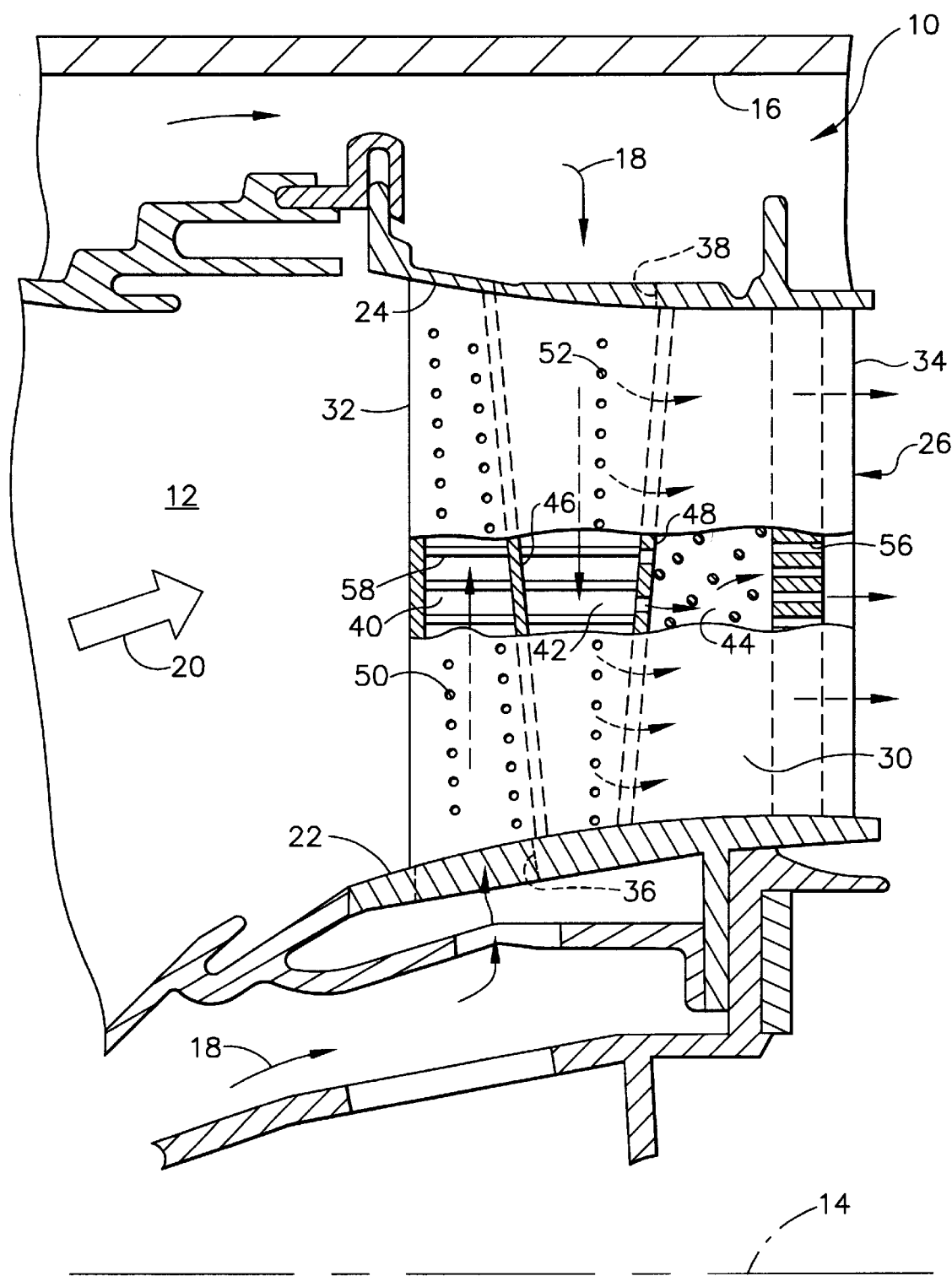
FIG. 1 is a partly sectional, axial view of a portion of a high pressure turbine nozzle disposed at an outlet of a combustor in accordance with an exemplary embodiment of the present invention.

Illustrated in FIG. 1 is a high pressure turbine nozzle 10 disposed at the outlet end of an annular combustor 12, shown in part. The nozzle and combustor are axisymmetrical about a longitudinal or axial centerline axis 14, and are suitably mounted inside an annular casing 16.

The nozzle and combustor are part of a gas turbine engine which may have any conventional configuration in which air 18 is pressurized in a multistage compressor (not shown) and mixed with fuel and ignited in the combustor for generating hot combustion gases 20 which are discharged through the nozzle to a first stage row of turbine rotor blades (not shown) extending outwardly from a supporting rotor disk. The compressor is powered by this first, or high pressure turbine, and a low pressure turbine (not shown) is typically disposed downstream from the first turbine for extracting additional energy from the combustion gases to power a conventional fan (not shown) disposed upstream from the compressor for a typical turbofan aircraft engine application.

The turbine nozzle 10 includes a radially inner band or hub 22 and a radially outer band 24 between which a plurality of circumferentially spaced apart stator vanes 26 extend integrally therewith, typically in the form a unitary casting.

Figure 2:
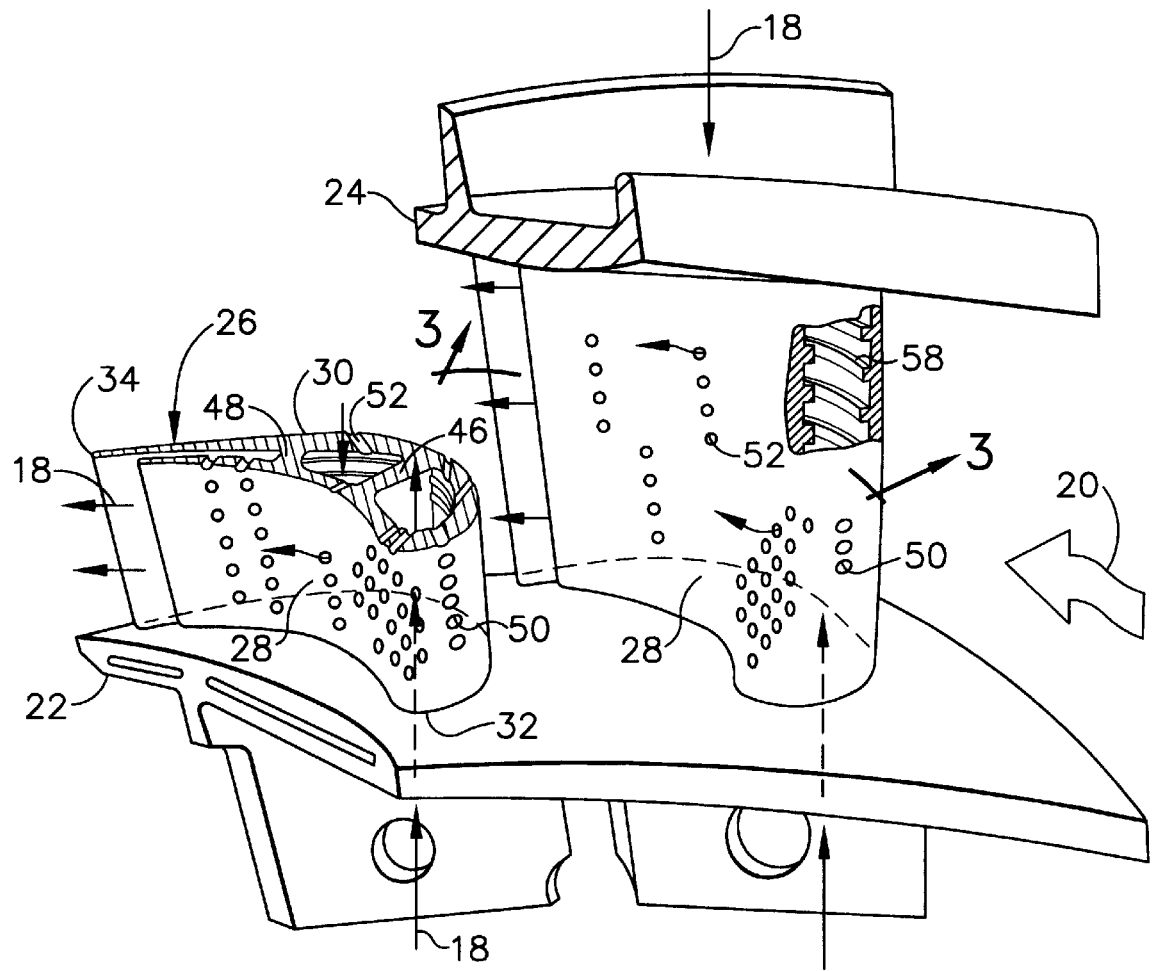
FIG. 2 is partly sectional, isometric view of a sector of the turbine nozzle illustrated in FIG. 1 showing cooling channels therein in accordance with an exemplary embodiment.

As shown in FIG. 2, the turbine nozzle is typically formed in a plurality of circumferential sectors, one being shown, with correspondingly arcuate inner and outer bands having two or more vanes therein. The sectors are arranged in a full ring having suitable seals therebetween for reducing thermal stress therein during operation under expansion and contraction of the components as subjected to the hot combustion gases 20 and cooling air 18. The cooling air is obtained by bleeding a portion of the air channeled through the compressor and suitably channeling it through the individual vanes, which are hollow.

Each vane 26 has a generally concave, pressure side 28 and a generally convex, suction side 30 extending axially between leading and trailing edges 32,34 and radially between the inner and outer bands. The combustion gases first engage the vanes at the leading edges 32 and then split around the two sides of the vane for flow thereover and past the trailing edges. Accordingly, the combustion gases experience a maximum static pressure at the vane leading edges which then decreases around the sides of the vanes.

Figure 3:
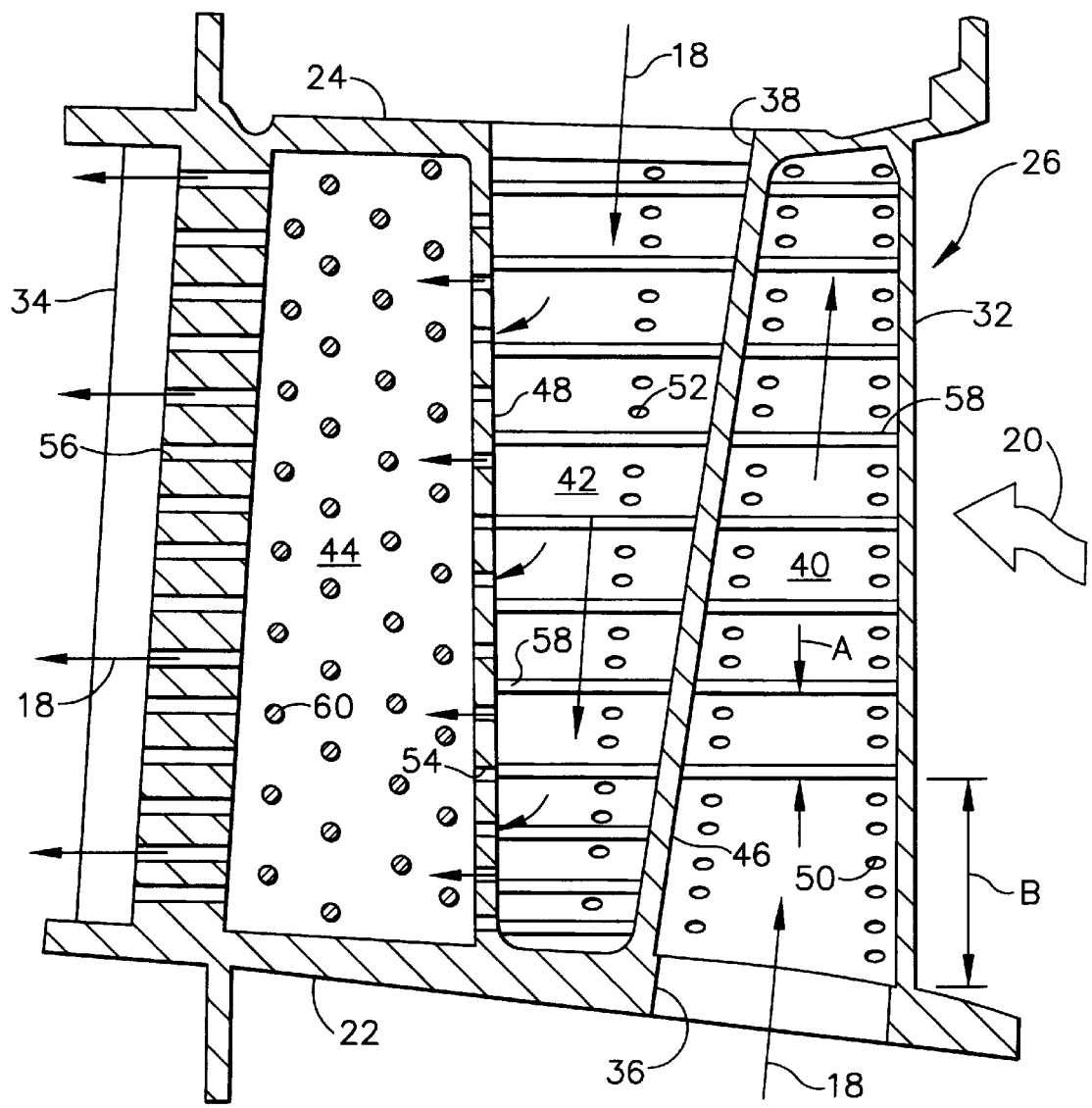
FIG. 3 is an axial sectional view through one of the nozzle vanes illustrated in FIG. 2 and taken generally along line 3—3.

A cross sectional view of one of the vanes 26 illustrated in FIG. 2 is shown in more detail in FIG. 3. The inner band 22 includes a radially inner first inlet 36 for receiving a corresponding portion of the cooling air 18, with the outer band 24 including a corresponding radially outer or second inlet 38 for a respective portion of the cooling air.

Each of the vanes also includes a first cooling circuit or channel 40 extending radially between the inner and outer bands in flow communication with the first inlet 36. A second cooling circuit or channel 42 extends through each vane radially between the outer and inner bands in flow communication with the second inlet 38. In the preferred embodiment illustrated in FIG. 3, a third cooling circuit or channel 44 extends radially between the inner and outer bands adjacent the second channel along the trailing edge.

The three channels 40,42,44 are disposed adjacent to each other and are separated in turn by a radially extending septum 46 and a radially extending rib or bridge 48 integrally formed at their radially outer ends with the corresponding inner and outer bands.

In the preferred embodiment illustrated in FIG. 3, the first channel 40 is disposed inside the vane immediately behind the vane leading edge 32, with the second channel 42 being disposed immediately aft of the first channel, and followed in turn by the third channel 44 disposed adjacent the vane trailing edge 34. The first channel 40 is thusly a leading edge cooling channel, the third channel 44 is a trailing edge cooling channel, and the second channel 42 is a midchord cooling channel disposed therebetween and spaced respectively from the leading and trailing edges.

The first channel 40 is fed cooling air by the corresponding first air inlet 36 at the inner band 22, and the second channel 42 is fed cooling air through the second air inlet 38 at the outer band 24. In this way, the leading edge and midchord cooling channels have separate and independent sources of cooling air with maximum pressure and maximum cooling capability. And, the cooling air is delivered to these two channels through independent flowpaths from the common compressor radially inwardly of the inner band and radially outwardly of the outer band.

Air flows through the first channel 40 for internally cooling the vane along its leading edge, and a plurality of first outlets 50 are disposed in the first channel through both the pressure and suction sides of the vane, and are spaced apart in rows extending between the inner and outer bands. The first outlets 50 are typically in the form of inclined film cooling holes which may have any conventional configuration for discharging the cooling air in corresponding films over the outer surface of the vane for providing an insulating air barrier against the hot combustion gases.

Similarly, the second channel 42 includes a plurality of second outlets extending through both the pressure and suction sides of the vane and spaced apart in rows between the inner and outer bands.

The first and second outlets 50,52 are preferably disposed in radial rows through the vane pressure and suction sides as inclined film cooling holes having any conventional configuration for forming respective films of cooling air along the outer surface of the vane for providing a thermal insulating barrier against the hot combustion gases. The septum 46 is preferably imperforate, with the first outlets 50 providing the sole exit for the first channel 40 for the air channeled therein through the corresponding first inlet 36.

Similarly, the second outlets 52 through the vane sides bounding the second channel 42 provide outlets for the second channel for the air channeled therein through the second inlet 38.

In the preferred embodiment, the inner and outer bands are imperforate below and above the third channel 44, with the bridge 48 including a row of additional second outlets in the form of crossover outlets 54 extending through the bridge in flow communication between the second and third channels 42,44. In this way, a portion of the air channeled through the second channel 42 is discharged therefrom through the bridge 48 for supplying cooling air to the third channel 44 for cooling this portion of the vane. The air from the third channel 44 is discharged therefrom through a row of trailing edge outlet holes 56 along the trailing edge 34 of the vane.

The imperforate septum 46 isolates the first channel 40 from the second channel 42 for maximizing cooling performance of the air channeled behind the vane leading edge. As indicated above, as the combustion gases 20 split during operation around the vane leading edge 32, they experience maximum static pressure. The isolated leading edge cooling channel 40 ensures that the corresponding pressure of the cooling air 18 channeled therein remains as high as possible for providing a suitable backflow margin for preventing ingestion of the hot combustion gases through the first outlets 50 during operation.

However, as the cooling air 18 travels radially outwardly through the first channel 40 it experiences pressure losses due to friction. Accordingly, the septum 46 is inclined between the inner and outer bands for being further from the leading edge 32 at the former and closer to the leading edge at the latter so that the first channel 40 converges away from the first inlet 36.

The converging first channel reduces the cross sectional flow area thereof as the air travels radially outwardly and is discharged in turn through corresponding ones of the first outlets 50. The converging first channel 40 therefore better matches the decreasing flowrate of the remaining air with the decreasing flow area to minimize the reduction in velocity and pressure of the cooling air as it travels radially outwardly through the first channel 40 for increasing the heat transfer cooling effectiveness thereof and corresponding backflow margin. In this way, the vane leading edge 32 is pressure compensated for more effective cooling against the heat influx from the hot combustion gases 20 for a given amount and given pressure of the supplied cooling air 18.

The inclined septum 46 which forms one boundary of the second channel 42 preferably cooperates with the bridge 48 for converging the second channel 42 radially inwardly away from the second inlet 38. The bridge 48 is preferably inclined oppositely to the septum 46 for maximizing the convergence of the second channel 42 away from the second inlet 38. The common septum 46 thusly permits the first and second channels 40,42 to separately converge away from their respective inlets, and oppositely to each other.

The second channel 42 converges with a reduced cross sectional area from the outer band to the inner band to accommodate the loss in cooling air as it is discharged from the corresponding outlets 52,54. The pressure and velocity of the cooling air in the second channel 42 is thusly maintained more constant even as the air is discharged in sequence from the holes. This improves the cooling effectiveness of the air as it flows through the second channel, while also maintaining a suitable backflow margin across the film cooling outlets 52 in the same manner as in the leading edge channel 40.

Each of the first and second channels 40,42 have separate and dedicated air inlets 36,38 so that the critical vane leading edge 32 may be cooled to full potential by the available cooling air channeled through the first channel 40. Since the midchord channel 42 is subject to less heating from the combustion gases flowing outside the vane, the cooling air delivered thereto has additional potential for not only cooling the vane at the midchord region but aft therefrom.

Accordingly, the crossover outlets 54 remove a portion of the cooling air from the second channel 42 for use in cooling the vane aft therefrom through the third channel 44. The initially radially directed air flowing through the second channel 42 flows axially through the crossover holes 54 and third channel 44 for a discharge through the trailing edge holes 56.

As shown in FIG. 3, each of the vanes preferably also includes a plurality of turbulators 58 disposed in each of the first and second channels 40,42 preferably along both the pressure and suction sides thereof for enhancing cooling effectiveness of the cooling air 18. The turbulators 58 are in the form of axially extending ribs disposed perpendicular or transverse to the radial direction of the cooling air 18, and are spaced apart from each other at a pitch spacing A. The turbulators trip the cooling air as it flows radially through the first and second channels 40,42 for enhancing cooling effectiveness thereof.

The turbulators may have any conventional form and typically have an equal width and height of about 0.4 mm, with a pitch spacing A of about 1.3 mm, for example. And, as illustrated in FIG. 2, the turbulators 58 on the opposite pressure and suction sides of the vane are preferably radially staggered in a conventional manner.

Correspondingly, the third channel 44 includes a plurality of pins 60 which extend completely across the channel between the opposite pressure and suction sides of the vane for also providing turbulence and increased cooling effectiveness in the third channel 44 in a conventional manner.

Since the turbulators 58 correspondingly reduce the available pressure of the cooling air as it flows through the first and second channels, the turbulators are preferably provided therein except in the first channel 40 adjacent the first inlet 36 at the inner band. As shown in FIG. 3, the first channel 40 includes a turbulator-less region over an initial part-span height B from the inner band which is devoid of the turbulators on both sides of the vane. The first channel 40 thusly has a continuous and smooth entrance region of span height B without turbulators to avoid the introduction of undesirable pressure losses in the cooling air.

Since the cooling air at the entrance of the first channel has its maximum pressure and velocity, the air has maximum cooling effectiveness for sufficiently cooling the vane leading edge region near the inner band without the need for the turbulators. Furthermore, the radial distribution of the combustion gases 20 as they engage the vane leading edge has correspondingly reduced temperature near the inner and outer bands thusly permitting the removal of turbulators at the entrance of the first channel.

The entrance span height B of the first channel devoid of turbulators may be determined for each design application, and in the exemplary embodiment illustrated in FIG. 3 is about a quarter of the full span height of the vane at the leading edge. Depending upon the turbulator pitch spacing A, multiple turbulators 58 could otherwise be introduced in the entrance of the first channel, but are not required.

Although the entrance of the first channel 40 is devoid of turbulators, the first channel nevertheless preferably includes turbulators up to the outer band 24 in accordance with conventional practice, and the second channel preferably includes the turbulators 58 over its full radial extent from the outer band 24 to the inner band 22.

Turbine nozzles typically include impingement baffles in corresponding cavities or channels therein for providing enhanced cooling effectiveness using impingement cooling. However, in the preferred embodiment illustrated in FIG. 3, the first and second channels 40,42 are preferably empty without impingement baffles therein, with cooling being provided solely by internal convection through the corresponding channels with external film cooling from the corresponding outlets thereof. In this way the complexity of introducing impingement baffles is avoided, while otherwise providing effective cooling of the vanes, especially at their leading edges.

The improved turbine nozzle disclosed above provides a combination of features having improved cooling effectiveness in a relatively simple manner. The strategic use of the turbulators and the converging channels 40,42 provides preferential cooling, especially at the vane leading edges, while maximizing the velocity and pressure of the cooling air along its separate flowpaths. The loss of air in the two channels is compensated by reducing the flow area to reduce pressure drop. Enhanced cooling while maintaining effective backflow margins is obtained in a turbine nozzle having a correspondingly long useful life.

However, as the engine for which the nozzle 10 is originally designed is grown in new models for higher power output, the cooling effectiveness of the nozzle will meet its limit. Higher power typically requires higher combustion gas temperature which would significantly shorten the useful life of the nozzle having limited cooling capability.

The improved nozzle 10 as described above has converging air channels 40,42 which are beneficially configured for later incorporating corresponding impingement baffles 62 for providing additional cooling. The baffles 62 are sheet metal sleeves disposed in respective ones of the first and second channels 40,42 as illustrated in FIG 4.

The first and second inlets 36,38 are preferably sized as large as the first and second channels thereat, and the baffles include correspondingly large inlets 64 disposed at the inner and outer bands 22,24, respectively. The cooling air 18 first enters the baffles at their inlets, and is discharged through impingement holes 66 therein as jets of cooling air directed against the inner surfaces of the vanes.

Impingement cooling effects increased heat transfer coefficient for improved internal cooling, but this is at the expense of a substantial pressure drop across the impingement holes. Accordingly, nozzles designed without impingement baffles cannot be retrofitted with impingement baffles because the pressure drop will correspondingly reduce the backflow margin at the vane film-cooling outlet holes below a suitable value. The use of impingement baffles usually requires an overall change in design of the turbine nozzle for their incorporation to maintain adequate backflow margin.

Figure 4:
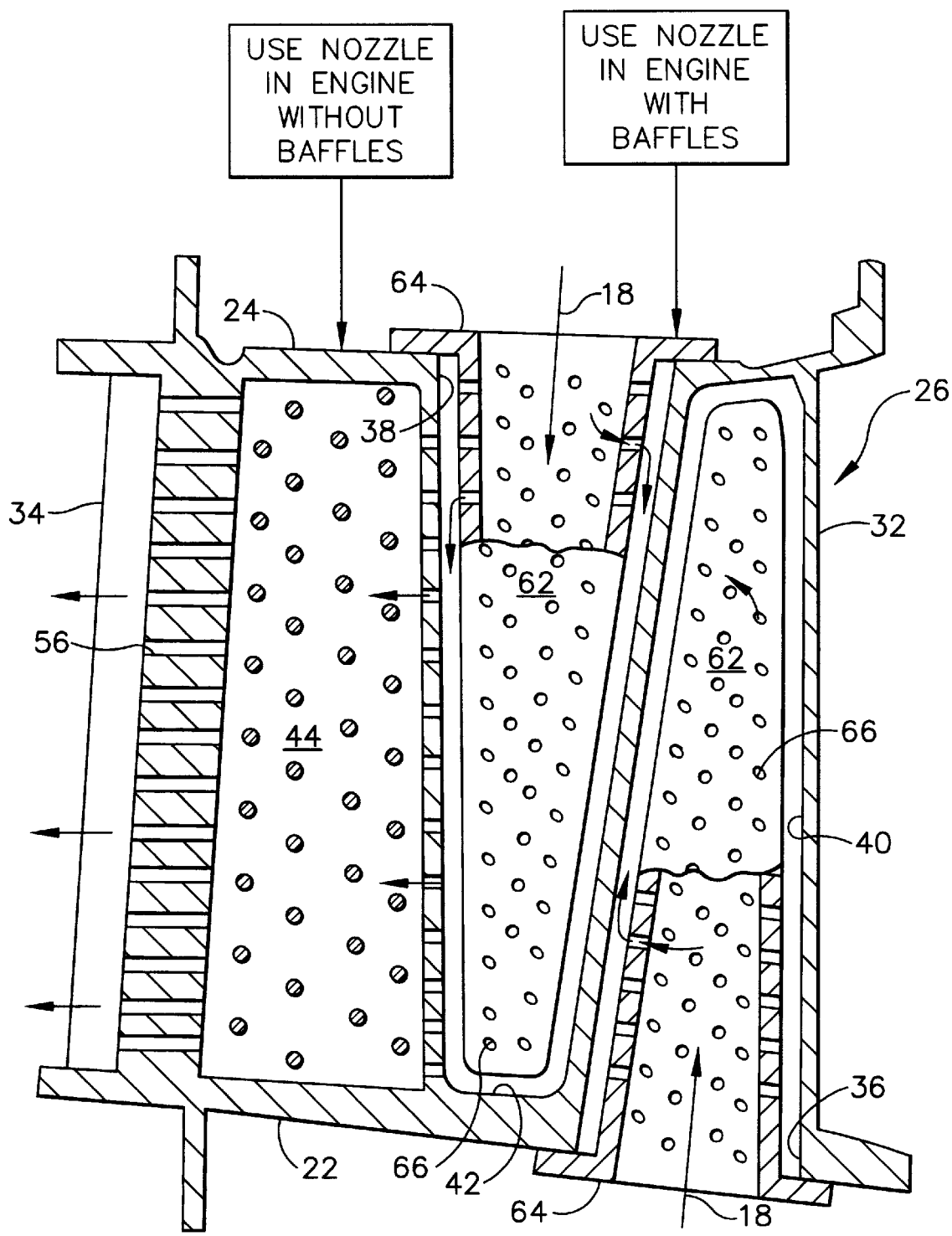
FIG. 4 is an axial sectional view through one of the nozzle vanes, like FIG. 3, including therein impingement baffles in accordance with another embodiment of the invention.

A particular advantage of the tapered-channel nozzle design illustrated in FIGS. 3 and 4 is the ability to use the same design, without modification, either without or with the impingement baffles 62. The first and second channels 40,42 and outlet holes therein are initially configured and sized to maintain positive backflow margin not only without the baffles, but also with the baffles irrespective of the substantial pressure drop resulting therefrom.

The same nozzle design may therefore be used in a gas turbine engine with or without the baffles 62, and therefore avoids the need to redesign the nozzle for engine growth.

The tapered flow channels 40,42 have large inlets attributable thereto, and allow the use of baffles having correspondingly large inlets 64. The large baffle inlets provide a minimum restriction to flow of the cooling air initially channeled therethrough and limit the acceleration thereof. Acceleration of the cooling air is undesirable because the associated static pressure decreases, thusly decreasing the available pressure which drops across the impingement holes. The tapered baffles maximize the available pressure of the cooling air as the baffles converge to their distal ends to maintain backflow margin over the span of the vane.

Nozzles used without the impingement baffles enjoy a substantial reduction in cost, while providing effective cooling for long life. As the engine design grows in power, the same nozzle design may then be retrofitted with the baffles without the cost associated with the redesign thereof ordinarily required. Additional air pressure may be readily obtained from the engine compressor for driving the cooling air through the baffled-nozzle for enhance cooling thereof.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine nozzle comprising:
   an inner band having a first inlet for receiving cooling air;
   an outer band having a second inlet for receiving cooling air;
   a plurality of vanes extending integrally between said bands, and each vane having opposite pressure and suction sides extending between leading and trailing edges and between said bands;
   a first cooling channel extending through each of said vanes between said bands in flow communication with said first inlet;
   a second cooling channel extending through each of said vanes between said bands in flow communication with said second inlet; and
   a septum integrally formed in each of said vanes between said inner and outer bands to separate said first and second channels, and being inclined between said bands for converging said first channel away from said first inlet, and converging said second channel away from said second inlet.

2. A nozzle according to claim 1 wherein:
   said first channel includes a plurality of first outlets spaced apart between said bands; and
   said second channel includes a plurality of second outlets spaced apart between said bands.

3. A nozzle according to claim 2 wherein each of said vanes further includes a plurality of turbulators disposed in each of said first and second channels along both said pressure and suction sides.

4. A nozzle according to claim 3 wherein said first channel is devoid of said turbulators adjacent said first inlet, and said second channel includes said turbulators adjoining said second inlet.

5. A nozzle according to claim 4 wherein said first channel includes said turbulators up to said outer band, and said second channel includes said turbulators up to said inner band.

6. A nozzle according to claim 4 wherein said first channel is disposed behind said vane leading edge, and said second channel is disposed aft of said first channel closer to said trailing edge.

7. A nozzle according to claim 4 wherein:
   each of said vanes further includes a third cooling channel extending between said bands, and separated from said second channel by a bridge; and
   said second outlets include a row of crossover outlets through said bridge in flow communication between said second and third channels.

8. A nozzle according to claim 7 wherein said bridge is inclined oppositely to said septum for converging said second channel away from said second inlet.

9. A nozzle according to claim 7 wherein each of said vanes further includes a row of trailing edge holes disposed in flow communication with said third channel for discharging said cooling air therefrom along said vane trailing edge.

10. A nozzle according to claim 4 wherein said first and second outlets are disposed through said vane pressure and suction sides as film cooling holes.

11. A nozzle according to claim 4 wherein said first and second channels are empty of impingement baffles.

12. A nozzle according to claim 4 further comprising impingement baffles disposed in respective ones of said first and second channels.

13. A nozzle according to claim 12 wherein said first and second inlets are as large as said first and second channels thereat, and said baffles include correspondingly large inlets for reducing acceleration of said cooling air therethrough.

14. A nozzle according to claim 13 wherein said first and second channels and outlet holes therein are sized for maintaining positive backflow margin across said outlet holes with and without said impingement baffles therein.

15. A method of using said nozzle according to claim 13 comprising:
    using said nozzle in a gas turbine engine without said impingement baffles therein; and
    using the same design of said nozzle in another gas turbine engine with said impingement baffles therein.

16. A turbine nozzle comprising:
    inner and outer bands having respective first and second air inlets;
    a plurality of hollow vanes joined integrally to said bands in flow communication with said air inlets; and
    first, second, and third cooling channels extending through each of said vanes, and separated in turn by a septum and a bridge integrally formed between said inner and outer bands, and said septum being inclined therebetween for separately converging said first and second channels oppositely to each other, with said first channel converging away from said first inlet, and said second channel converging away from said second inlet.

17. A nozzle according to claim 16 wherein:
    said first channel includes said first air inlet at said inner band;
    said second channel includes said second air inlet at said outer band; and
    all three channels include respective outlet holes for discharging said cooling air therefrom.

18. A nozzle according to claim 17 wherein said septum is imperforate, and said outlet holes are disposed in rows through said pressure and suction sides of said vanes, and in a row through said bridge, and in another row along a trailing edge of said vanes.

19. A nozzle according to claim 18 wherein both said first and second channels include turbulators therein, except in said first channel adjacent said first inlet at said inner band.

20. A nozzle according to claim 19 wherein said first channel is devoid of said turbulators for about a quarter span of said vanes from said inner bands.

21. A nozzle according to claim 19 wherein said first channel is disposed behind a leading edge of each vane, said second channel is disposed aft therefrom, and said third channel is disposed adjacent said vane trailing edge.

22. A nozzle according to claim 18 further comprising impingement baffles disposed in respective ones of said first and second channels.

23. A nozzle according to claim 22 wherein said first and second inlets are as large as said first and second channels thereat, and said baffles include correspondingly large inlets for reducing acceleration of said cooling air therethrough.

24. A nozzle according to claim 23 wherein said first and second channels and outlet holes therein are sized for maintaining positive backflow margin across said outlet holes with and without said impingement baffles therein.

25. A method of using said nozzle according to claim 23 comprising:
    using said nozzle in a gas turbine engine without said impingement baffles therein; and
    using the same design of said nozzle in another gas turbine engine with said impingement baffles therein.

* * * * *